(12) United States Patent
Fischer et al.

(10) Patent No.: US 8,764,058 B2
(45) Date of Patent: Jul. 1, 2014

(54) AIR BAG WITH IMPROVED TEAR STITCH

(75) Inventors: Kurt F. Fischer, Leonard, MI (US); John Klakulak, Clinton Township, MI (US); Heather R. Kramer, Macomb, MI (US); Alberto Rodriguez, Rochester Hills, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 13/539,599

(22) Filed: Jul. 2, 2012

(65) Prior Publication Data

US 2012/0267883 A1    Oct. 25, 2012

Related U.S. Application Data

(60) Division of application No. 12/077,826, filed on Mar. 21, 2008, now Pat. No. 8,262,130, which is a continuation-in-part of application No. 11/881,918, filed on Jul. 30, 2007, now Pat. No. 7,954,850.

(51) Int. Cl.
*B60R 21/2346* (2011.01)
*B60R 21/2338* (2011.01)
*B60R 21/239* (2006.01)

(52) U.S. Cl.
USPC .............. 280/743.2; 280/730.1; 280/739

(58) Field of Classification Search
USPC ............. 280/743.2, 730.1, 739, 742, 728.3
See application file for complete search history.

(56) References Cited

U.S. PATENT DOCUMENTS

| | | |
|---|---|---|
| 3,527,475 A | 9/1970 | Carey et al. |
| 3,573,885 A | 4/1971 | Brawn et al. |
| 3,642,303 A | 2/1972 | Irish et al. |
| 3,879,057 A | 4/1975 | Kawashima et al. |
| 3,944,249 A | 3/1976 | Smith et al. |
| 4,097,065 A | 6/1978 | Okada et al. |
| 4,262,931 A | 4/1981 | Strasser et al. |
| 4,360,223 A | 11/1982 | Kirchoff |
| 4,500,114 A | 2/1985 | Grey, Jr. |
| 4,805,930 A | 2/1989 | Takada |
| 4,907,616 A | 3/1990 | Bergsma |
| 5,007,662 A | 4/1991 | Abramczyk et al. |
| 5,016,913 A | 5/1991 | Nakajima et al. |
| 5,020,567 A | 6/1991 | Proulx |
| 5,044,663 A | 9/1991 | Seizert |
| 5,217,249 A | 6/1993 | Kokeguchi |
| 5,246,250 A | 9/1993 | Wolanin et al. |
| 5,362,101 A | 11/1994 | Sugiura et al. |
| 5,405,166 A * | 4/1995 | Rogerson ............... 280/739 |
| 5,489,119 A | 2/1996 | Prescaro et al. |
| 5,639,118 A | 6/1997 | Rhule et al. |

(Continued)

*Primary Examiner* — Karen Beck

(74) *Attorney, Agent, or Firm* — Tarolli, Sundheim, Covell & Tummino LLP

(57) ABSTRACT

An apparatus (10) for helping to protect an occupant (20) of a vehicle (12) includes an inflatable vehicle occupant protection device (14) having a deflated condition and an inflated condition. Tear stitching (200*a*) interconnects portions (220*a*, 230*a*) of the protection device (14). The tear stitching (200*a*) includes first and second stitch lines (300, 320) positioned next to each other. The first stitch line (300) is adapted to rupture in response to tension of a first magnitude exerted on the interconnected portions (220*a*, 230*a*) while inflating to an initially deployed condition. The second stitch line (320) is adapted to remain intact and being capable itself of maintaining the protection device in the initially deployed condition subsequent to rupture of the first stitch line (300) and throughout inflation and deployment of the protection device (14).

22 Claims, 8 Drawing Sheets

(56) References Cited

U.S. PATENT DOCUMENTS

| | | | |
|---|---|---|---|
| 5,695,214 A | 12/1997 | Faigle et al. | |
| 5,853,191 A * | 12/1998 | Lachat | 280/730.2 |
| 5,853,192 A | 12/1998 | Sikorski et al. | |
| 5,899,494 A | 5/1999 | Lane, Jr. | |
| 5,899,495 A | 5/1999 | Yamamoto et al. | |
| 5,918,901 A | 7/1999 | Johnson et al. | |
| 5,931,497 A | 8/1999 | Fischer | |
| 5,979,937 A | 11/1999 | Yoshida et al. | |
| 6,123,358 A | 9/2000 | Ryan et al. | |
| 6,247,726 B1 * | 6/2001 | Ryan | 280/739 |
| 6,290,257 B1 | 9/2001 | Bunce et al. | |
| 6,390,501 B1 | 5/2002 | Greib et al. | |
| 6,592,146 B2 | 7/2003 | Pinsenschaum et al. | |
| 6,659,499 B2 | 12/2003 | Jenkins | |
| 6,773,030 B2 | 8/2004 | Fischer | |
| 6,832,778 B2 | 12/2004 | Pinsenschaum et al. | |
| 6,932,385 B2 | 8/2005 | Hawthorn et al. | |
| 7,134,691 B2 * | 11/2006 | Dunkle et al. | 280/743.2 |
| 7,441,805 B2 * | 10/2008 | Jamison et al. | 280/743.2 |
| 7,445,237 B2 | 11/2008 | Boyle, III et al. | |
| 7,475,906 B2 | 1/2009 | Goto et al. | |
| 7,658,407 B2 | 2/2010 | Ford et al. | |
| 7,770,926 B2 | 8/2010 | Schneider et al. | |
| 7,793,978 B2 | 9/2010 | Vigeant et al. | |
| 7,810,839 B2 | 10/2010 | Denys et al. | |
| 7,922,200 B2 * | 4/2011 | Webber | 280/743.2 |
| 7,954,850 B2 | 6/2011 | Fischer et al. | |
| 7,988,194 B2 | 8/2011 | McFadden et al. | |
| 2005/0127653 A1 * | 6/2005 | Williams et al. | 280/743.2 |
| 2006/0131847 A1 | 6/2006 | Sato et al. | |
| 2006/0249943 A1 | 11/2006 | Bauer et al. | |
| 2007/0145729 A1 | 6/2007 | Ishiguro et al. | |
| 2007/0164545 A1 | 7/2007 | Muller | |
| 2007/0182144 A1 * | 8/2007 | Aranzulla et al. | 280/743.2 |
| 2008/0042416 A1 * | 2/2008 | Razazi et al. | 280/743.2 |
| 2008/0073892 A1 | 3/2008 | Rose et al. | |
| 2008/0284147 A1 | 11/2008 | Goto et al. | |
| 2008/0315567 A1 * | 12/2008 | Fischer et al. | 280/732 |
| 2009/0026814 A1 | 1/2009 | Kim et al. | |
| 2009/0033081 A1 | 2/2009 | Fischer et al. | |
| 2009/0039630 A1 | 2/2009 | Schneider et al. | |
| 2009/0236839 A1 | 9/2009 | McFadden et al. | |
| 2010/0019476 A1 | 1/2010 | Pausch | |
| 2010/0140910 A1 | 6/2010 | Fischer et al. | |
| 2012/0306187 A1 * | 12/2012 | Mendez et al. | 280/743.2 |

* cited by examiner

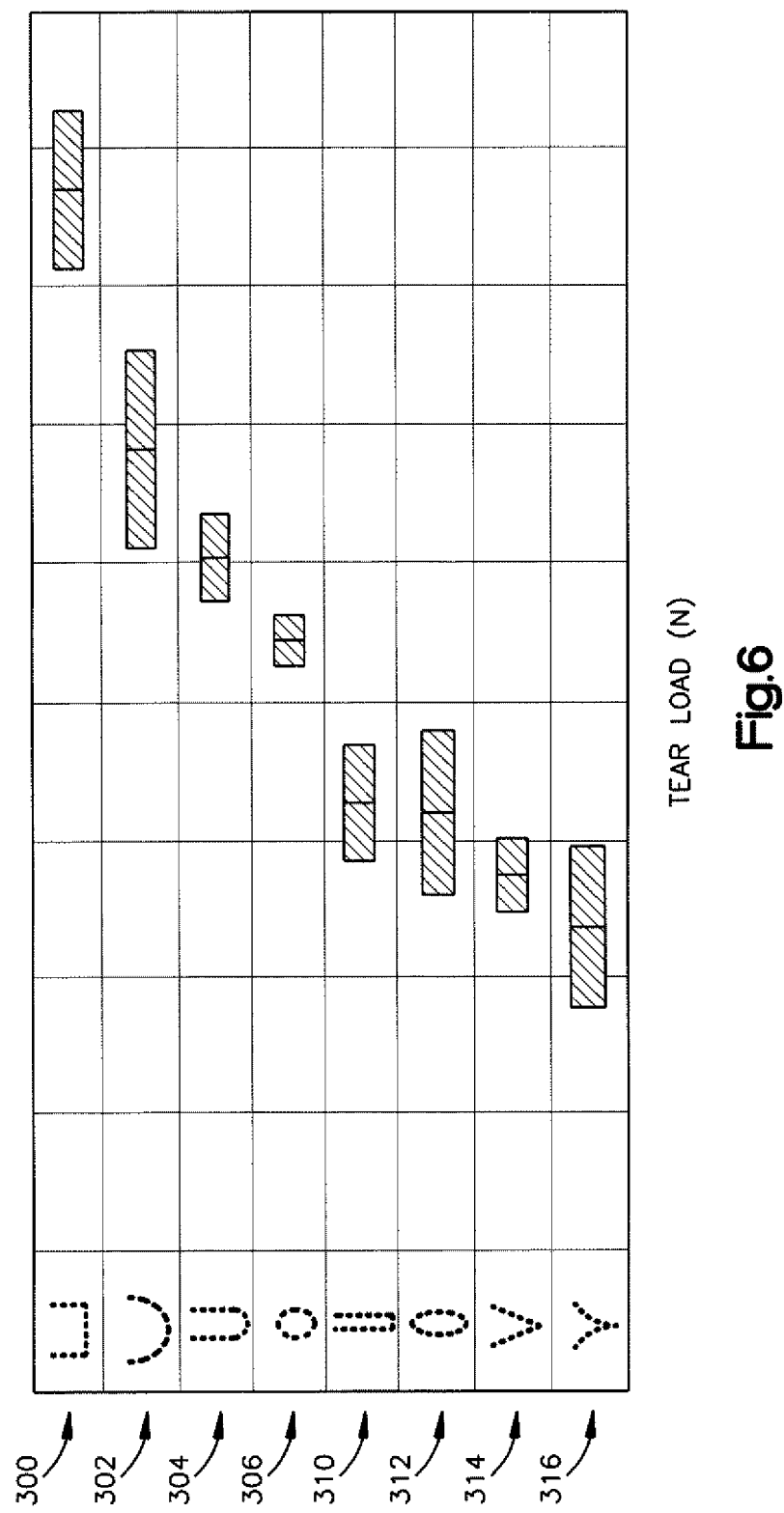

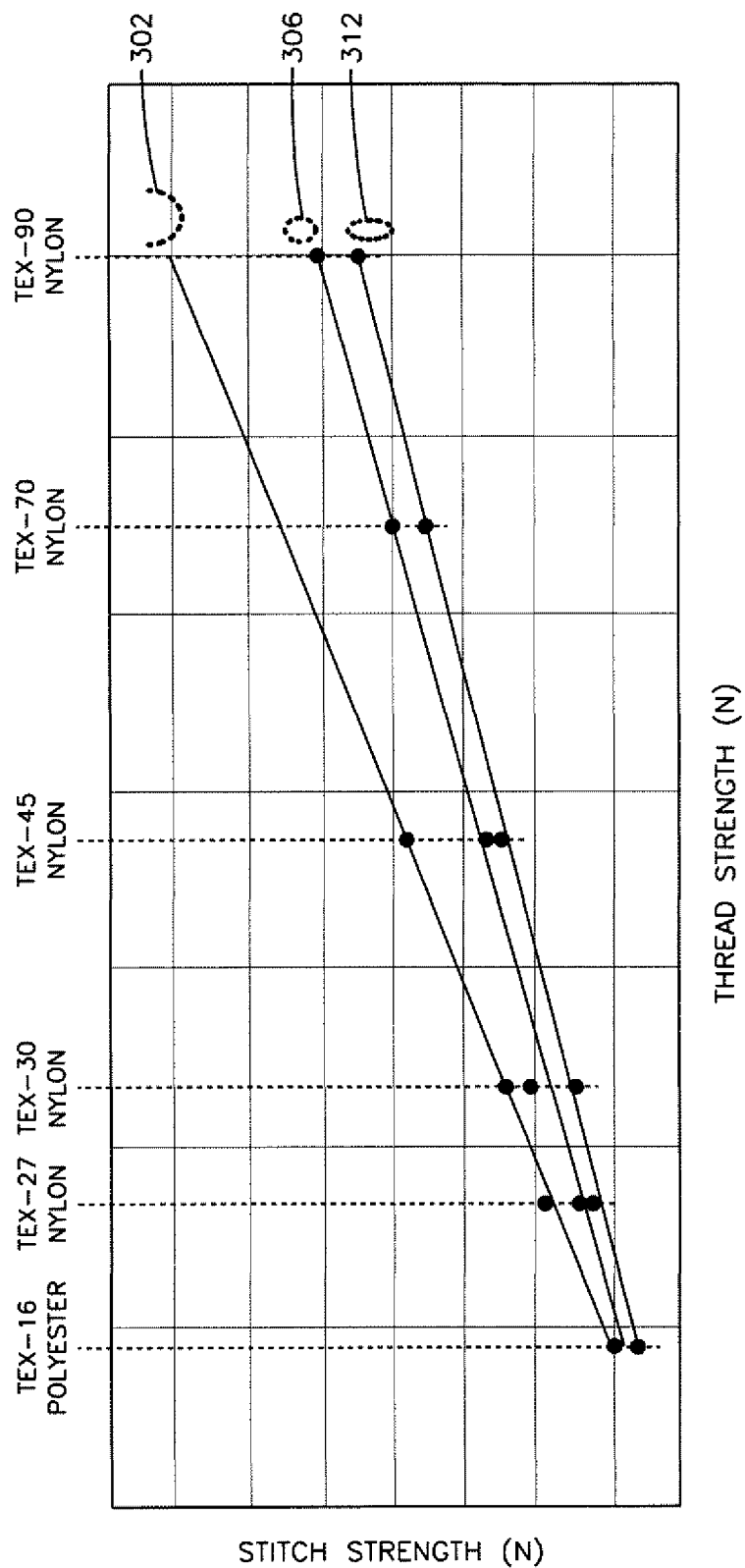

AIR BAG WITH IMPROVED TEAR STITCH

RELATED APPLICATIONS

This application is a divisional of U.S. patent application Ser. No. 12/077,826, filed Mar. 21, 2008 now U.S. Pat. No. 8,262,130, which is a continuation in part of U.S. patent application Ser. No. 11/881,918 filed on Jul. 30, 2007 now U.S. Pat. No. 7,954,850, which is hereby incorporated by reference.

FIELD OF THE INVENTION

The present invention relates to an apparatus for helping to protect an occupant of a vehicle. More particularly, the present invention relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

Driver air bags are typically stored in a deflated condition in a housing that is mounted on the vehicle steering wheel. An air bag cover is connectable with the housing and/or steering wheel to help enclose and conceal the air bag in a stored condition. Upon deployment of the driver air bag, the air bag cover opens to permit the air bag to move to an inflated position. The air bag cover opens as a result of forces exerted on the cover by the inflating driver air bag.

SUMMARY OF THE INVENTION

The present invention relates to an apparatus for helping to protect an occupant of a vehicle. The apparatus includes an inflatable vehicle occupant protection device having a deflated condition and an inflated condition. Tear stitching interconnects portions of the protection device. The tear stitching includes first and second stitch lines positioned next to each other. The first stitch line is adapted to rupture in response to tension of a first magnitude exerted on the interconnected portions while inflating to an initially deployed condition. The second stitch line is adapted to remain intact and being capable itself of maintaining the protection device in the initially deployed condition subsequent to rupture of the first stitch line and throughout inflation and deployment of the protection device.

The present invention also relates to an apparatus for helping to protect an occupant of a vehicle. The apparatus includes an inflatable vehicle occupant protection device having a deflated condition and an inflated condition. Tear stitching interconnects portions of the protection device, the tear stitching comprises first and second stitch lines positioned next to each other. The first stitch line is adapted to rupture in response to initial deployment of the protection device. The second stitch line is adapted to remain intact in response to obstructed deployment of the protection device and to rupture in response to unobstructed deployment and pressurization of the protection device.

The present invention also relates to an apparatus for helping to protect an occupant of a vehicle. The apparatus includes an inflatable vehicle occupant protection device having a deflated condition and an inflated condition. A vent is actuatable to vent inflation fluid from the protection device. Tear stitching comprises first and second stitch lines positioned next to each other that form an interconnection that connects portions of the protection device. The first stitch line is adapted to rupture in response to deployment of the protection device. The second stitch line is adapted to maintain the interconnection in response to vented pressurization of the protection device, and to rupture and thereby break the interconnection in response to non-vented pressurization of the protection device.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIGS. 6 and 7 are charts illustrating certain properties of the apparatus of FIGS. 5A and 5B;

DETAILED DESCRIPTION OF THE INVENTION

Figure 1:
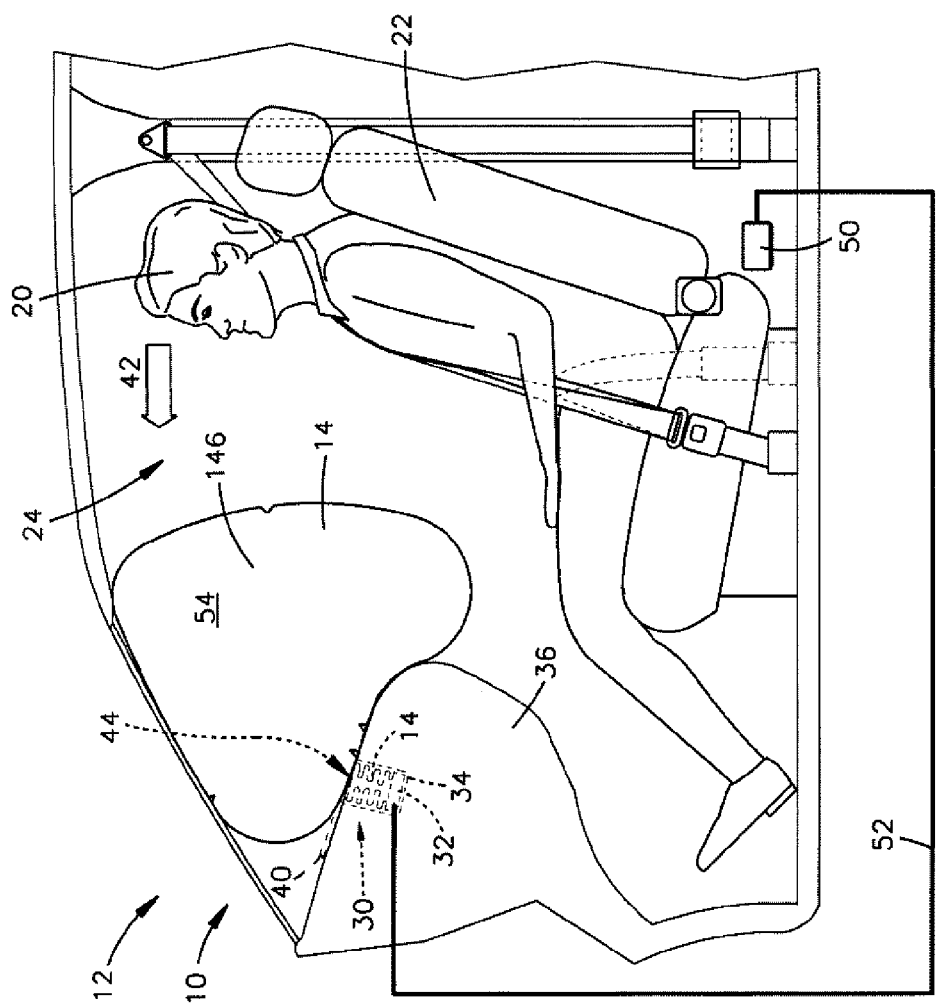
FIG. 1 is a schematic side view illustrating an apparatus for helping to protect an occupant of a vehicle, according to a first embodiment of the present invention.

An apparatus 10 for helping to protect an occupant 20 of a vehicle 12 includes an inflatable vehicle occupant protection device 14 in the form of an air bag. In the embodiment illustrated in FIG. 1, the air bag 14 is a passenger frontal air bag for helping to protect an occupant 20 of a seat 22 on a passenger side 24 of the vehicle 12.

The air bag 14 may be part of an air bag module 30 that includes an inflator 32 and a housing 34. The air bag 14 has a stored condition, indicated by dashed lines in FIG. 1, in which the air bag is folded and placed in the housing 34. The module 30 is mounted to a dash or instrument panel 36 of the vehicle 12. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIG. 1 to uncover an opening 44 through which the air bag 14 may be deployed from the stored condition in the housing 34. The door 40 may be connected to the vehicle 12, e.g., the instrument panel 36, either directly or through the housing 34, by means (not shown), such as a plastic hinge portion, a strap, or a tether.

The inflator 32 is actuatable to provide inflation fluid to an inflatable volume 54 of the air bag 14 to deploy the air bag to the inflated condition. The inflator 32 may be of any known type, such as stored gas, solid propellant, augmented, or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

The air bag 14 may have one or more actuatable features for helping to control or tailor inflation of the air bag in response to vehicle conditions, occupant conditions, or both. These features may be actuatable actively, for example, in response to conditions determined via active sensors, or passively, for example, having a configuration responsive to physical conditions at the time of inflation. Examples of such actuatable features are illustrated in FIGS. 2 and 3.

Figure 2:
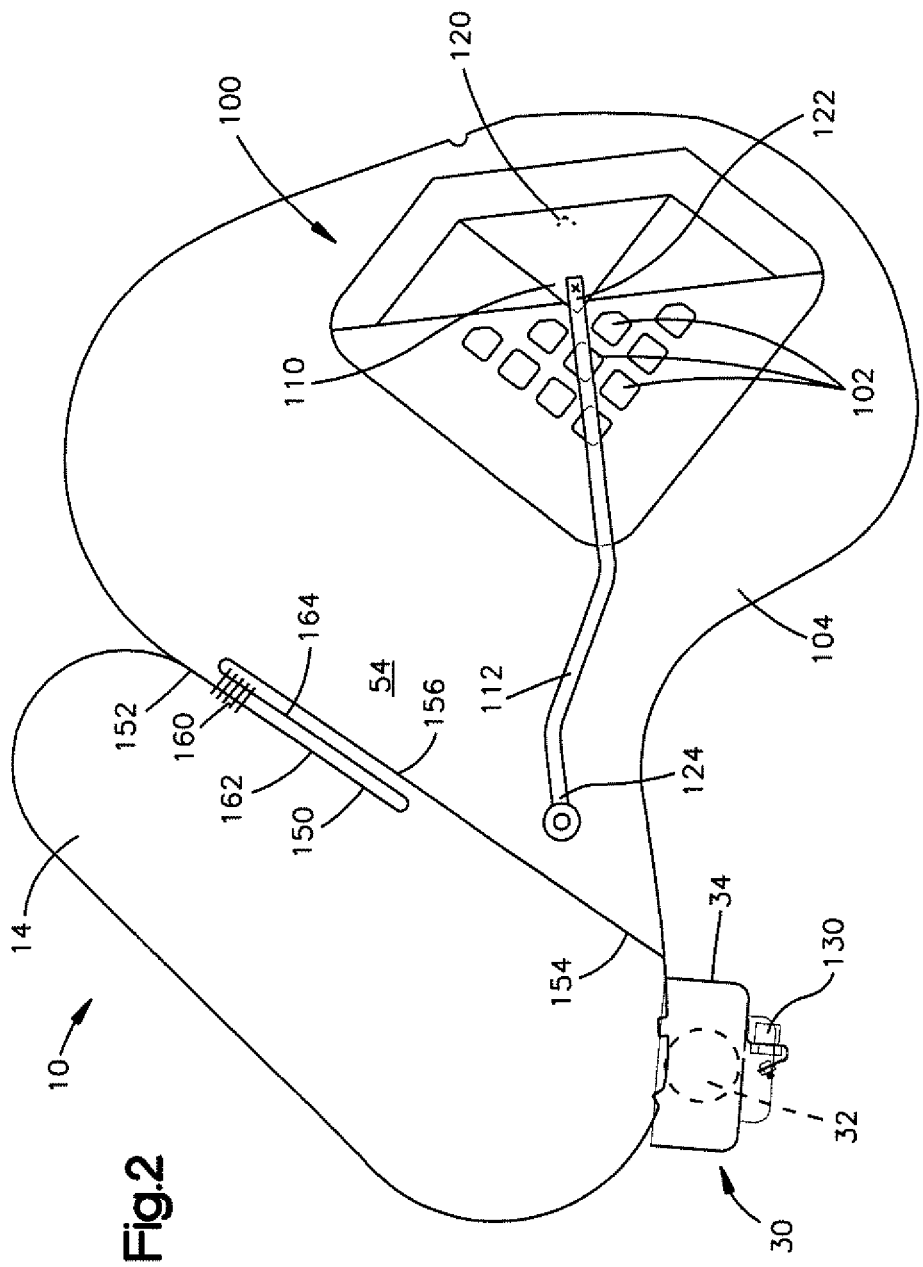
FIG. 2 is a schematic illustration of a portion of the apparatus of FIG. 1 in a first condition.
Figure 3:
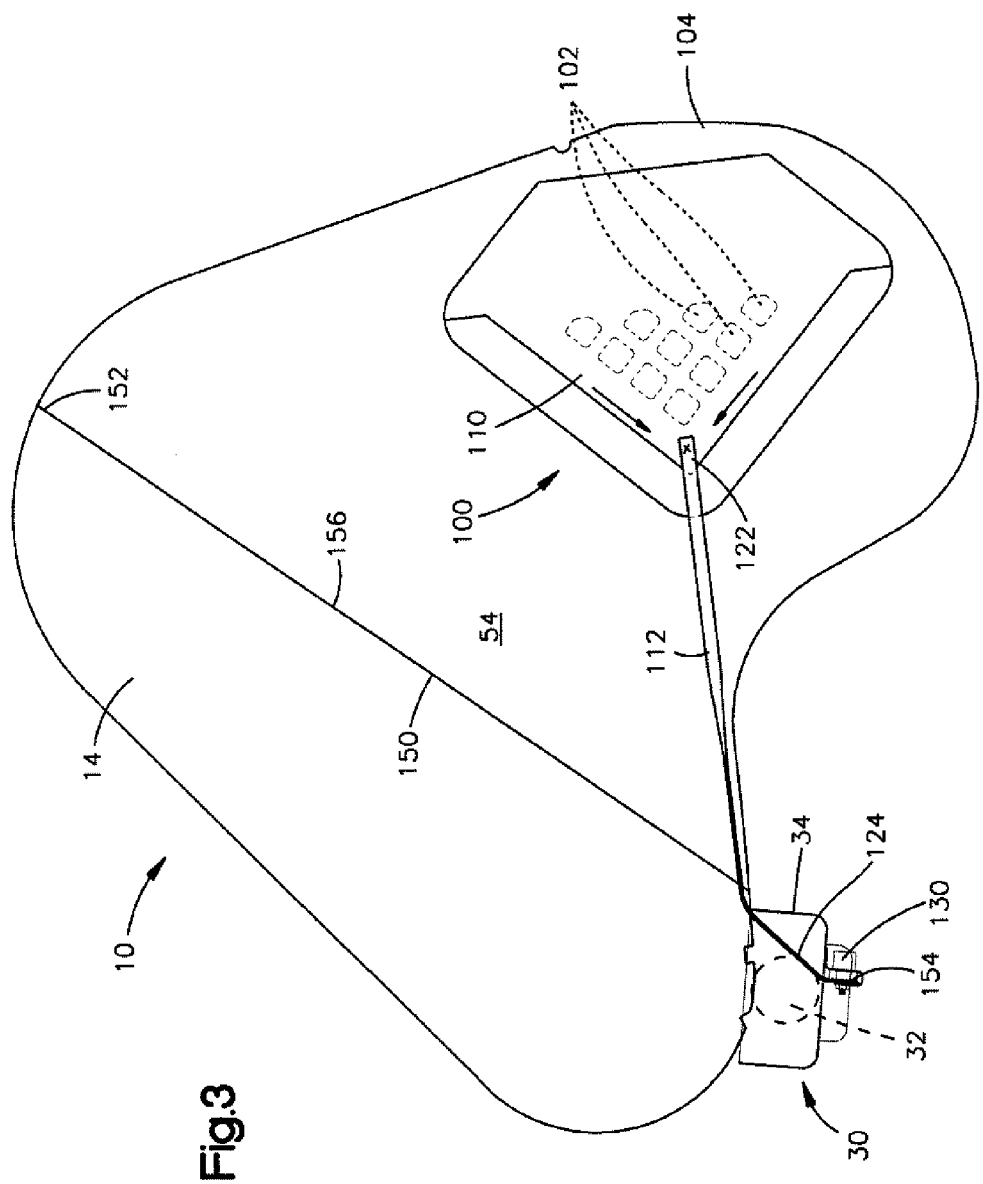
FIG. 3 is a schematic illustration of a portion of the apparatus of FIG. 1 in a second condition.

Referring to FIGS. 2 and 3, the air bag 14 includes a vent 100 and a volume reducing tether 150. The vent 100 is selectively actuatable to release inflation fluid from the inflatable volume 54 of the air bag 14. The tether 150 helps maintain the air bag 14 at a first volume and is actuatable to allow the air bag to inflate to a second, larger volume.

The vent 100 may have various configurations. In the embodiment illustrated in FIGS. 2 and 3, the vent 100 includes one or more vent openings 102 formed in a side panel 104 of the air bag 14, a vent door 110 secured to the side panel, and a flexible elongated member 112, such as a tether, secured to the door panel.

The vent door 110 is secured to the side panel 104 by known means (not shown), such as stitching, ultrasonic welding, heat bonding, or adhesives. The vent 100 has an open condition (FIG. 2) in which the vent door 110 is positioned away from the vent openings 102 and thereby permits inflation fluid to vent, i.e., flow, through the vent openings. In the open condition, the vent door 110 is folded away from the vent openings 102 and held in place by a releasable tear stitch 120.

The tether 112 has a first end portion 122 secured to the vent door 110 by known means, such as stitching, and an opposite second end portion 124 secured to the air bag module 30. As shown in FIGS. 2 and 3, the second end portion 124 is secured to the housing 34 by an actuatable fastener 130 that is selectively actuatable to release the connection between the tether 112 and the housing.

The volume reducing tether 150 has a first end portion 152 secured to the air bag 14 at a first location and an opposite second end portion 154 secured to the air bag at a second location different than the first location. The first and second end portions 152 and 154 may be secured to the air bag 14 by known means (not shown), such as stitching, ultrasonic welding, heat bonding, or adhesives.

The volume reducing tether 150 has an intermediate portion 156 between the first and second end portions 152 and 154, which is doubled over onto itself and has overlying portions 162 and 164 interconnected via releasable tear stitching 160. The tear stitching 160 is configured to release the overlying portions 162 and 164 when forces acting on the tear stitching, such as tension on the volume reducing tether 150, reach or exceed a predetermined magnitude. The volume reducing tether 150 thus has a first, shortened condition (FIG. 2) when the overlying portions 162 and 164 are interconnected via the tear stitching 160 and a second, lengthened condition (FIG. 3) when the tear stitching releases the overlying portions.

In the shortened condition (FIG. 2), the volume reducing tether 150 limits or restricts movement of the air bag 14. The volume reducing tether 150 thus prevents the air bag 14 from reaching the fully deployed, large volume condition of FIG. 3 and maintains the air bag in the reduced size and volume condition of FIG. 2. The volume reducing tether 150, in the shortened condition, is thus effective to reduce or limit the effective size and volume of the air bag 14. In the lengthened condition, the volume reducing tether 150 allows the air bag 14 to reach the fully inflated and deployed condition of FIG. 3.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition, such as the fully inflated and deployed condition illustrated in solid lines in FIG. 1. The air bag 14, while inflated, helps protect the vehicle occupant 20 from impacts with parts of the vehicle 12, such as the instrument panel 36.

When an event occurs which inflation of the air bag 14 is desired, the vent 100 and volume reducing tether 150 respond to vehicle conditions, occupant conditions, or both to help control inflation and deployment of the air bag. This control may be implemented actively, for example, through the implementation of actuatable means, such as an actuatable fastener. In this instance, the actuatable fastener may be actuatable in response to conditions sensed via one or more suitable vehicle or occupant condition sensors (not shown), such as occupant position sensors, seat position sensors, and seatbelt buckle latch sensors.

Additionally or alternatively, the control may be implemented passively through the physical construction or configuration of the air bag 14. For example, the air bag 14 may be constructed such that the vent 100, the volume reducing tether 150, or both, are actuated in response to unobstructed deployment of the air bag 14 when the occupant is in a normally seated position. In this configuration, the air bag 14 may also be constructed to block actuation of the vent 100, the volume reducing tether 150, or both, in response to the obstructed deployment of the air bag 14 when, for example, the occupant is away from the normally seated position.

In the embodiment of FIGS. 2 and 3, the vent 100 is controlled both actively and passively. To achieve active control of the vent 100, the second end portion 124 of the tether 112 is connected to the housing 34 via actuatable fastener 130. The actuatable fastener 130 is operatively connected to control means (not shown), such as one or more sensors or controllers, that control actuation of the fastener in response to sensed vehicle conditions, occupant conditions, or both. For example, the actuatable fastener 130 may be operatively connected to a controller or microprocessor that controls actuation of the fastener in response to a vehicle seat position sensor and a seatbelt buckle latch sensor. Passive control of the vent 100 depends on the tether 112 being connected to the housing 34 and, therefore, on the actuatable fastener 130 remaining in the unactuated condition.

The actuatable fastener 130 may be actuated to maintain the vent 100 in the open condition in response to a belted occupant, as illustrated in FIG. 1. The actuatable fastener 130 may remain unactuated to permit actuation of the vent 100 to the closed condition in response to an unbelted occupant (not shown). Alternatively or additionally, the actuatable fastener 130 may be actuated to maintain the vent 100 in the open condition in response to the vehicle seat 22 (see FIG. 1) being in a full-forward position in the vehicle 12.

The self-adapting vent 100 adapts based on the position of the occupant 20 upon the occurrence of the event for which inflation of the air bag 14 is desired. Prior to such an event, the vent 100 is in the open condition while stored in the air bag module 30.

If, upon the occurrence of the event, the occupant 20 is in the normally seated position of FIG. 1, the air bag 14 inflates to the normally deployed condition. Since the occupant 20 is in the normally seated position, the actuatable fastener 130 remains unactuated and the tether 112 remains connected to the housing 34. As the air bag 14 inflates, the tether 112 becomes tensioned and applies a force that pulls on the vent door 110. The force applied to the vent door 110 breaks or otherwise ruptures the tear stitching 120 and moves the door portion to the closed condition of FIG. 3. The vent door 110 blocks inflation fluid flow through the vent openings 102, and the air bag 14 inflates to the normally deployed and pressurized condition of FIG. 3.

The vent 100 may respond actively to sensed vehicle conditions. For example, if, upon the occurrence of the event, the occupant's seatbelt is buckled or the seat is in the full-forward position, it may be desirable to maintain the vent 100 in the open condition. Since the seat full-forward position or the seatbelt latched condition can be sensed actively via sensors, the response to these conditions may be to actuate the fastener 130, which releases the tether 112 (see FIG. 2). As a result, the tether 112 is not tensioned, the vent door 110 does not become positioned over the vent openings 102, and the vent 100 remains in the open condition.

The vent 100 may respond passively to sensed vehicle conditions. For example, if, upon the occurrence of the event, the occupant 20 is positioned away from the normally seated position (not shown), it may be desirable to maintain the vent 100 in the open condition. The occupant's position may be determined passively by the air bag 14 being impeded from reaching the fully inflated position. This may be the case when the occupant 20 is leaned forward so as to impede inflation of the air bag. Because the air bag 14 does not fully inflate, the tether 112, which is connected to the housing 34 via the unactuated fastener 130, is not tensioned. As a result, the vent door 110 does not become positioned over the vent openings 102, and the vent 100 remains in the open condition.

The volume reducing tether 150 is operable, and the air bag 14 is thus inflatable to the large volume and small volume conditions, in response to both actively and passively determined conditions. The volume reducing tether 150 may become tensioned to the degree sufficient to rupture the tear stitching 160 only when the inflation fluid pressure in the air bag 14 reaches a threshold level. This threshold pressure may be reached only when the vent 100 is in the closed condition. The condition of the vent 100 is thus determinative of whether the tear stitching 160 is ruptured. Since, as described above, the vent 100 is actuatable in response to conditions determined both actively and passively, the tear stitching 160 is rupturable in response to conditions determined both actively and passively.

If, upon the occurrence of an event for which inflation of the air bag 14 is desired, the occupant 20 is in the normally seated position of FIG. 1, the vent 100 is actuated to the closed condition and the air bag 14 inflates to the normally deployed condition. As the air bag 14 inflates and pressurizes, the volume reducing tether 150 becomes tensioned. When the air bag 14 reaches the threshold pressure, the tension on the volume reducing tether 150 causes the tear stitching 160 to rupture, which releases the air bag to inflate and deploy to the large volume, fully inflated and deployed condition of FIG. 3.

If, upon the occurrence of the event, the occupant's seatbelt is buckled or the seat is in the full-forward position, the appropriate sensors may respond by actuating the fastener 130, which releases the tether 112 (see FIG. 2) and maintains the vent 100 in the open condition. Since the vent 100 is in the open condition, pressurization of the air bag 14 is limited, which limits the tension on the volume reducing tether 150. This prevents rupture of the tear stitching 160, which causes the air bag 14 to inflate and deploy to the small volume condition of FIG. 2.

If, upon the occurrence of the event, the occupant 20 is positioned away from the normally seated position (not shown), the occupant may impede the air bag 14 from reaching the fully inflated position. As a result, the vent door 110 does not become positioned over the vent openings 102, and the vent 100 remains in the open condition. Since the vent 100 is in the open condition, pressurization of the air bag 14 is limited, which limits the tension on the volume reducing tether 150. This prevents rupture of the tear stitching 160, which causes the air bag 14 to inflate and deploy to the small volume condition of FIG. 4.

Figure 4:
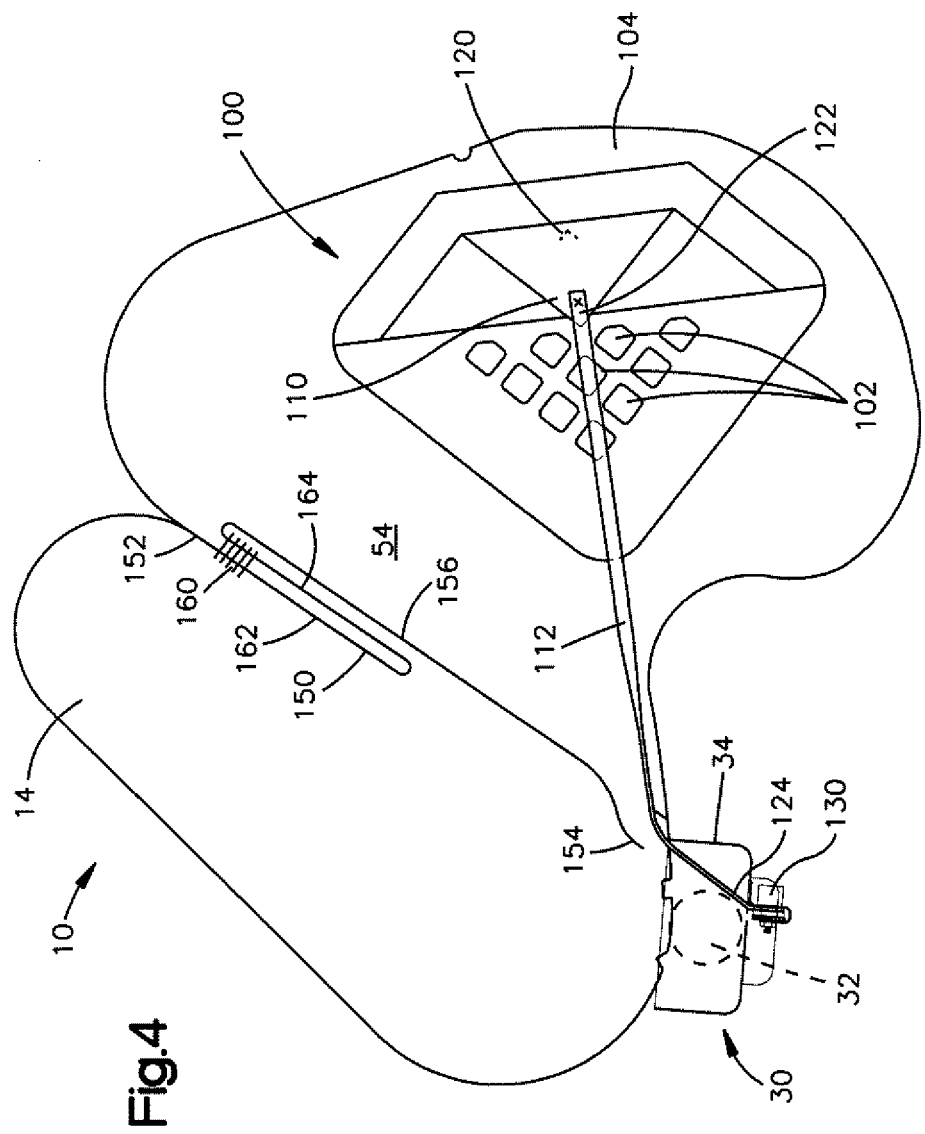
FIG. 4 is a schematic illustration of a portion of the apparatus of FIG. 1 in a third condition.

According to the present invention, a rupturable tear stitch configuration that promotes predictability, repeatability, and reliability in releasing interconnected fabrics is used to form the tear stitchings 120 and 160. The tear stitchings 120 and 160 illustrated in FIGS. 2-4 are two examples of potential implementations of the tear stitch configuration of the present invention. Those skilled in the art will appreciate that the tear stitch configuration of the present invention may be implemented to provide a releasable connection between any desired fabric components of a vehicle occupant protection device.

Figure 5A:
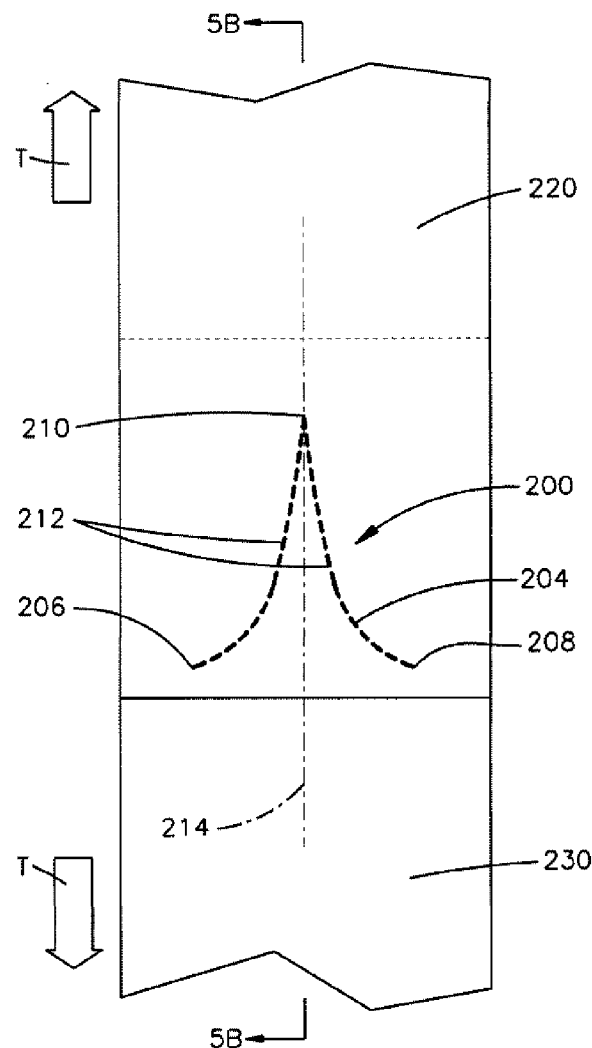
FIG. 5A is an enlarged schematic view illustrating certain portions of the apparatus of FIGS. 1-4.
Figure 5B:
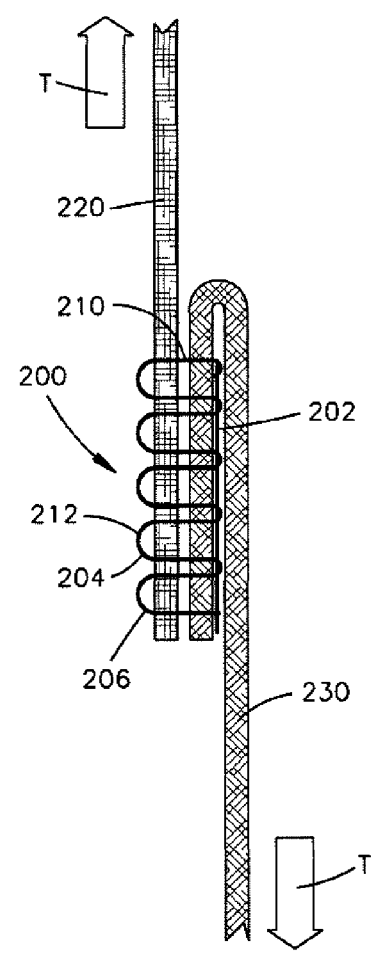
FIG. 5B is a sectional view taken generally along line 5B-5B in FIG. 5A.

FIGS. 5A and 5B illustrate by way of example tear stitching 200 in accordance with the present invention. In FIGS. 5A and 5B, the tear stitching 200 interconnects first and second portions of material 220 and 230 that are positioned in an adjacent and overlying manner. The first and second portions of material 220 and 230 may be portions of different pieces of material or may be portions of a single piece of material. For example, representative of the tear stitching 120 in FIGS. 2-4, the first portion of material 220 may correspond to the vent door 110 and the second portion of material 230 may correspond to the side panel 104 of the air bag 14. As another example, representative of the tear stitching 160 in FIGS. 2-4, the first and second portions of material 220 and 230 may correspond to the overlying portions 162 and 164 of the volume reducing tether 150.

The tear stitching 200 may be constructed using conventional sewing techniques and equipment. The tear stitching 200 includes a bobbin thread 202 and a stitch thread 204. The stitch thread 204 extends through the first and second portions 220 and 230 and loops around the bobbin thread. As best shown in FIG. 5A, the tear stitching 200 is a line of stitching that has a start point 206 and an end point 208. A break point 210 is located between (e.g., at the midpoint between) the start point 206 and end point 208. The break point 210 is the point along the tear stitching 200 where it is intended that the tear stitching rupture under tension.

As viewed in FIG. 5A, the tear stitching 200 has an inverted, generally curved V-shaped configuration with outwardly diverging curved segments or legs 212 that meet at the break point 210. The tear stitching 200 is arranged such that an axis of symmetry 214 of the tear stitching extends generally parallel to the two opposed directions in which tension, indicated generally by the arrows labeled T in FIGS. 5A and 5B, is applied to the first and second portions 220 and 230. The axis of symmetry 214 bisects the V-shaped configuration of the tear stitching 200.

The tear stitching 200 is configured to rupture in response to the tension T applied to the first and second portions of material 220 and 230. This tension T may correspond, for example, to the tension applied to the vent door 110 and side panel 104 during deployment of the air bag 14. This tension T may also correspond, for example, to the tension applied to the overlying portions 162 and 164 of the volume reducing tether 150.

The first and second portions of material 220 and 230 are arranged such that the tension T applied to the portions results in a peeling action or motion between the portions, which acts on the tear stitching 200. In the embodiment illustrated in FIGS. 5A and 5B, this peeling action is produced by folding back the second portion 230 such that it overlies the tear stitching 200. When the tension T is applied, the resulting peeling action helps focus the tension on the break point 210 of the tear stitching 200.

According to the present invention, the predictability, reliability, and repeatability with which the tear stitching 200 ruptures in response to the tension T is tailored through the selection of materials and configuration of the tear stitching. The generally inverted V-shaped configuration of the tear stitching 200 illustrated in FIGS. 5A and 5B, which is oriented generally parallel to the tension T, focuses the tension T on the break point 210. Thus, it will be appreciated that the tension T is focused primarily on the few (e.g., 1 or 2) stitches that make up the break point 210 of the tear stitching 200.

Since the tension T is focused on the break point 210, the tear stitching 200 begins to rupture when the stitch thread 204 at the break point ruptures and begins to unravel from the material 220 and 230. The stitch thread 204, having a known tensile strength, will rupture when the tension reaches a known value. Since the break point 210 comprises only a few stitches of the stitch thread 204, the number of variables that could affect the tension T at which the tear stitching begins to rupture is reduced as opposed to, for example, tear stitching in which the tension is spread over a large number of stitches. Therefore, predictable, reliable, and repeatable rupturing of the tear stitching 200 can be achieved by selecting a stitch thread with an appropriate tensile strength.

To help ensure that the tear stitching 200 ruptures when tension T reaches a predetermined threshold level, the bobbin thread 202 may be selected to have a tensile strength greater than the stitch thread 204. This will help ensure that the stitch thread 204 ruptures first under the tension T and thus helps improve the predictability, reliability, and repeatability with which the tear stitching 200 ruptures.

Also, according to the present invention, the leg portions 212 of the tear stitching 200 may be designed to be just sufficient to maintain a predetermined strength for the connection between the overlying portions of material 220 and 230. By so designing the leg portions 212, the amount of tear stitching 200 that needs to unravel in order to release the portions 220 and 230 is minimized. This helps increase the speed at which the tear stitching 200 ruptures when the tension T reaches the desired magnitude, which can further promote the predictability, reliability, and repeatability with which the tear stitching 200 ruptures.

Through testing and evaluation, it was determined that the performance of the tear stitching 200 can be affected through the stitch configuration (e.g., the shape of the tear stitching). To make this determination, various stitch configurations and thread types were tested to determine the load at which the tear stitching ruptured. The results of these tests are illustrated in the chart of FIG. 6.

Referring to FIG. 6, various stitch shapes were tested to determine the load at which the tear stitching ruptured. In all of the tests, the tear stitching interconnected overlying portions of material in the same manner as that illustrated in FIGS. 5A and 5B. In each test, the tear stitching was oriented in a manner similar or identical to that shown in FIGS. 5A and 5B. In particular, the tear stitching was oriented such that the axis of symmetry of the tear stitching extended generally parallel to the opposite directions in which the tension is applied to the first and second portions of material, thus focusing the tension primarily on the break point for that particular stitch configuration.

As shown in FIG. 6, the generally curved V-shaped configuration shown and described in FIGS. 5A and 5B and along with seven other stitch configurations were tested. In each stitch configuration, the stitch thread was Tex-30 Nylon thread and the bobbin thread was Tex-138 Nylon with a stitch size of about 3 millimeters and a thread tension of about 120 cN (1.2 Newtons). The overlying portions of material were constructed of 700 dtex woven Nylon coated with silicone on one side.

The tests were conducted on eight different tear stitching configurations: square U-shaped tear stitching 300, semicircular tear stitching 302, curved U-shaped tear stitching 304, O-shaped tear stitching 306, skinny square U-shaped tear stitching 310, oval-shaped tear stitching 312, straight V-shaped tear stitching 314, and curved V-shaped tear stitching 316. The curved V-shaped tear stitching 316 was identical to that illustrated in FIGS. 5A and 5B. Each of these tear stitching configurations incorporated ten stitches, except the skinny square U-shaped tear stitching 310, which incorporated 11 stitches. For each stitch configuration, the overlying portions of material were arranged as shown in FIGS. 5A and 5B and interconnected via the tear stitching. For the circular tear stitching 306 and the oval shaped tear stitching 312, the start and end points are located opposite the break point. Tension was applied as shown in FIGS. 5A and 5B until the tear stitching ruptured, at which point the magnitude of the tension was recorded.

The testing was performed five to six times per stitch configuration. Based on the results of the tests, known statistical methods were employed to determine the expected performance for each stitch configuration with confidence intervals of 95%. The confidence levels for each stitch configuration are illustrated in the shaded areas associated with each stitch configuration in FIG. 6. By "95% confidence intervals," it is meant that, for each stitch configuration, the average rupture tension will fall within the range defined by the shaded areas 95% of the time. Thus, for example, for the curved V-shaped stitch configuration 316, the average rupture load will fall within the range of about 55-79 Newtons 95% of the time.

From the above, those skilled in the art will appreciate that, according to the present invention, the strength of the rupturable tear stitching can be tailored through the configuration or shape of the tear stitching itself without altering the thread type and while maintaining a consistent (e.g., minimal) number of stitches. This allows the rupture strength to be tailored to performance criteria that may be application specific, even within the same overall application.

For example, referring to FIGS. 2-4, it may be desirable that the rupture strength of the tear stitching 120 used to secure the vent door 110 be less than the rupture strength of the tear stitching 160 used to secure the volume reducing tether 150. In this instance, the desired performance can be achieved, for example, by using the square U-shaped stitch configuration 300 (see FIG. 6) or the semi-circular stitch configuration 302 for the tear stitching 160 so that the volume reducing tether 150 is maintained in the small volume condition by relatively strong tear stitching. In a similar manner, straight V-shaped stitch configuration 314 or curved V-shaped stitch configuration 316 can be used for the tear stitching 120 so that the vent door 110 is maintained in the open condition by comparatively weaker tear stitching.

Through testing and evaluation, it was determined that the performance of the tear stitching 200 can also be affected by the type of thread used to construct the tear stitching. To make this determination, threads of various types were used to form three of the stitch configurations described above. These stitch configurations with the various threads were tested to determine the load at which the tear stitching ruptured. The results of these tests are illustrated in the chart of FIG. 7.

Referring to FIG. 7, the stitch configurations used to perform the tests were the semi-circular tear stitching 302, the circular tear stitching 306, and the oval-shaped tear stitching 312. In all of the tests, the tear stitching interconnected overlying portions of material in the same manner as that illustrated in FIGS. 5A and 5B. In each test, the tear stitching was oriented in a similar or identical manner as that shown in FIGS. 5A and 5B. For the circular tear stitching 306 and the oval shaped tear stitching 312, the start and end points are located opposite the break point. In particular, the tear stitching was oriented such that the axis of symmetry of the tear stitching extended generally parallel to the opposite directions in which the tension was applied to the first and second portions of material, thus focusing the tension primarily on the break point.

Each stitch configuration included ten stitches, the stitch size was about 3 millimeters, and the thread tension was about 120 cN (1.2 Newtons). The overlying portions of material were constructed of 700 dtex woven Nylon with a silicone coating applied on one side.

The tests were conducted on six different thread types for each stitch configuration: Tex-16 polyester thread, Tex-27 Nylon, Tex-30 Nylon, Tex-45 Nylon, Tex-70 Nylon, and Tex-90 Nylon. For each stitch configuration, the overlying portions of material were arranged as shown in FIGS. 5A and 5B and interconnected via the tear stitching. Tension was applied, as shown in FIGS. 5A and 5B until the tear stitching ruptured, at which point the magnitude of the tension was recorded. For each of the six thread types, the test was repeated 5-6 times on each of the three stitch configurations.

The chart of FIG. 7 illustrates the results of the tests. In FIG. 7, the horizontal axis represents the tensile strength of the six different threads used in the tests. As illustrated in FIG. 7, the Tex-16 polyester thread has a tensile strength of about 1.8 Newtons, the Tex-27 nylon thread has a tensile strength of about 3.4 Newtons, the Tex-30 nylon thread has a tensile strength of about 4.7 Newtons, the Tex-45 nylon thread has a tensile strength of about 7.5 Newtons, the Tex-70 nylon thread has a tensile strength of about 11 Newtons, and the Tex-90 nylon thread has a tensile strength of about 14 Newtons. The vertical axis represents the stitch strength of the three stitch configurations using the different thread types.

In FIG. 7, the dots plotted on the chart represent average rupture strengths of the three stitch configurations using the different threads. For example, for the semi-circular stitch configuration 302 using the Tex-45 nylon thread, the average rupture strength was about 190 Newtons. As another example, for the circular stitch configuration 306 using the Tex-45 nylon thread, the average rupture strength was about 135 Newtons. As a further example, for the elliptical stitch configuration 312 using the Tex-45 nylon thread, the average rupture strength was about 125 Newtons. At this point, it should be noted that average stitch strengths for the semi-circular tear stitch configuration 302 using the Tex-70 and Tex-90 nylon threads were not recorded because the strength of the tear stitching exceeded 250 Newtons, which was the maximum tension that the device used to measure the tension was capable of measuring.

Based on the results presented in FIG. 7, it will be appreciated that as the thread strength increases, the strength of the tear stitching also increases. The lines plotted on the chart and associated with the stitch configurations approximate the relationship between thread strength and the strength of the tear stitching using a best-fit algorithm. These plotted lines illustrate that this relationship is approximately linear.

From the above, those skilled in the art will appreciate that, according to the present invention, the strength of the rupturable tear stitching can be tailored through the selection of the thread used to construct the tear stitching without altering the configuration or shape of the tear stitching itself and while maintaining a consistent (e.g., small) number of stitches. This also allows the rupture strength to be tailored to performance criteria that may be application specific, even within the same overall application.

For example, referring to FIGS. 2-4, it may be desirable that the rupture strength of the tear stitching 120 used to secure the vent door 110 be less than the rupture strength of the tear stitching 160 used to secure the volume reducing tether 150. In this instance, the desired performance can be achieved, for example, by using the Tex-70 or Tex-90 nylon thread to construct the tear stitching 160 so that the volume reducing tether 150 is maintained in the small volume condition by relatively strong tear stitching. In a similar manner, Tex-16 polyester or Tex-27 nylon thread can be used to construct the tear stitching 120 so that the vent door 110 is maintained in the open condition by comparatively weaker tear stitching.

Combining the relationships illustrated in FIGS. 6 and 7, those skilled in the art will further appreciate that, according to the present invention, the strength of the rupturable tear stitching can be tailored through a combination of selecting the type of thread used to construct the tear stitching and the configuration or shape of the tear stitching while maintaining a consistent (e.g., small) number of stitches. This also allows the rupture strength to be tailored to performance criteria that may be application specific, even within the same overall application.

For example, referring to FIGS. 2-4, it may be desirable that the rupture strength of the tear stitching 120 used to secure the vent door 110 be less than the rupture strength of the tear stitching 160 used to secure the volume reducing tether 150. In this instance, the desired performance can be achieved, for example, by using the Tex-70 or Tex-90 nylon thread with a square U-shaped stitch configuration 300 or semi-circular stitch configuration 302 to construct the tear stitching 160, and by using Tex-16 polyester or Tex-27 nylon thread with a V-shaped stitch configuration 314 or curved V-shaped stitch configuration 316 to construct the tear stitching 120.

Figure 8:
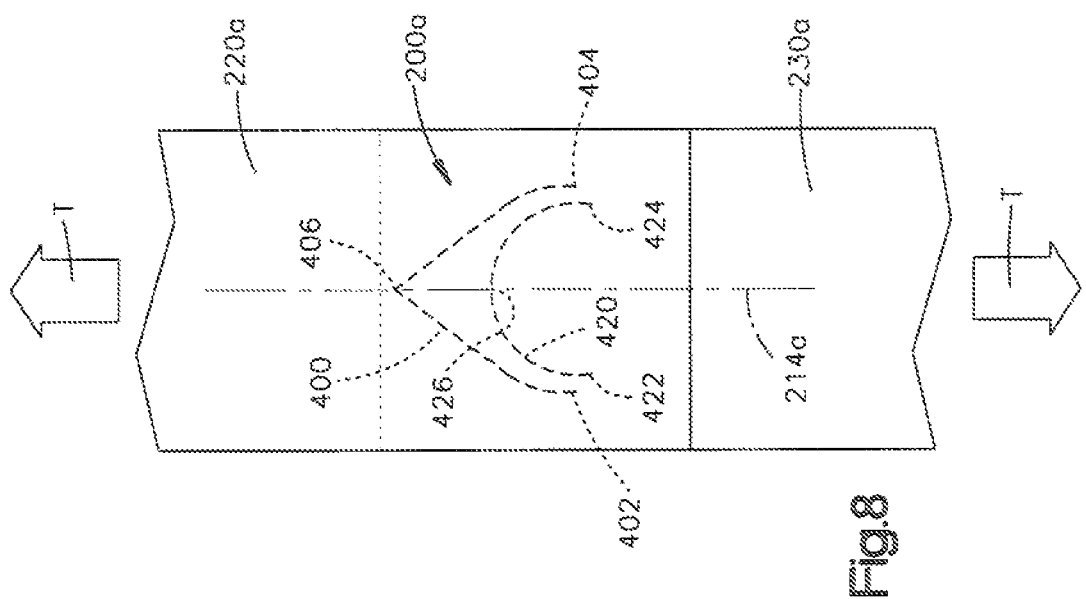
FIG. 8 is an enlarged schematic view illustrating certain portions of the apparatus according to a second embodiment of the present invention.

FIG. 8 illustrate by way of example tear stitching in accordance with a second embodiment of the present invention. The second embodiment of the invention is similar to the first embodiment of the invention illustrated in FIGS. 5A and 5B. Accordingly, numerals similar to those of FIGS. 5A and 5B will be utilized in FIG. 8 to identify similar components, the suffix letter "a" being associated with the numerals of FIG. 8 to avoid confusion.

In FIG. 8, the tear stitching 200a interconnects first and second portions of material 220a and 230a that are positioned in an adjacent and overlying manner. The first and second portions of material 220a and 230a may be portions of a single piece of material (as shown) or may be portions of different pieces of material (not shown). For example, representative of the tear stitching 120 in FIGS. 2-4, the first portion of material 220a may correspond to the vent door 110 and the second portion of material 230a may correspond to the side panel 104 of the air bag 14. As another example, representative of the tear stitching 160 in FIGS. 2-4, the first and second portions of material 220a and 230a may correspond to the overlying portions 162 and 164 of the volume reducing tether 150.

As shown in FIG. 8, the tear stitching 200a of the second embodiment includes two rupturable stitch lines: a first stitch line 400 and a second stitch line 420. The first and second stitch lines 400 and 420 may be constructed using conventional sewing techniques and equipment and include a bobbin thread and a stitch thread (not shown), as described above in regard to the embodiment of FIGS. 5A and 5B.

The first stitch line 400 has a start point 402, an end point 404, and a break point 406 located between (e.g., at the midpoint between) the start and end points. The break point 405 is the point along the first stitch line 400 where it is intended that the stitching begins to rupture under tension. Similarly, the second stitch line 420, has a start point 422, an end point 424, and a break point 426 located between (e.g., at the midpoint between) the start and end points. The break point 426 is the point along the second stitch line 420 where it is intended that the stitching begins to rupture under tension.

The first and second stitch lines 400 and 420 may have any of the shapes or configurations described above and illustrated in FIG. 6. The first and second stitch lines 400 and 402 may also have any of the material constructions described above and illustrated in FIG. 7. According to the present invention, the shape, configuration, and material construction of the first and second stitch lines 400 and 420 may be selected to tailor the stitching 200a to perform desired functions and to exhibit desired performance characteristics.

As viewed in FIG. 8, the first stitch line 400 has the inverted, generally curved V-shaped configuration described above and the second stitch line 420 has the semi-circular configuration described above. The tear stitching 200a is arranged such that an axis of symmetry 214a of the tear stitching extends generally parallel to the opposite directions in which tension, indicated generally by the arrows labeled T in FIG. 8, is applied to the first and second portions 220a and 230a. These configurations, along with their material constructions, are selected to tailor the tear stitching 200a to perform desired functions and to exhibit desired performance characteristics.

The tear stitching 200a is configured to rupture in response to the tension T applied to the first and second portions of material 220a and 230a. This tension T may correspond, for example, to the tension applied to the vent door 110 and side panel 104 during deployment of the air bag 14. This tension T may also correspond, for example, to the tension applied to the overlying portions 162 and 164 of the volume reducing tether 150.

As shown in FIG. 8, the first and second portions of material 220a and 230a are arranged such that the tension T applied to the portions results in a peeling action of motion between the portions, which acts on the tear stitching 200a. In the embodiment illustrated in FIG. 8, this peeling action is produced by folding back the second portion 230a such that it overlies the tear stitching 200a. The tension T, when applied, acts first on the break point 406 of the first stitch line 400 and then on the break point 426 of the second stitch line 420 after the first stitch line ruptures.

Since the tension T is focused initially on the break point 406, the first stitch line 400 begins to rupture when the stitch thread at the break point ruptures and begins to unravel from the material 220a and 230a. The stitch thread, having a known tensile strength, will rupture when the tension T reaches a known value. Since the break point 406 comprises only a few stitches of the stitch thread, the number of variables that could affect the tension at which the first stitch line 400 begins to rupture is reduced as opposed to, for example, tear stitching in which the tension is spread over a large number of stitches.

In the configuration of the tear stitching 200a shown in FIG. 8, the function of the first stitch line 400 may, for example, be to help absorb or damp the forces exerted on the tear stitching 200a during initial deployment of the air bag 14. The first stitch line 400 may thus be configured to rupture in response to tension forces less than those in response to which the second stitch line 420 is configured to rupture. The first stitch line 400 may rupture, either partially or completely, under forces exerted on the tear stitching 200a during initial deployment of the air bag 14, leaving the second stitch line 420 intact so that it can respond in the desired manner to the vehicle and occupant conditions in the vehicle.

For example, the second stitch line 420 may be configured to rupture in response to forces exerted on the tear stitching 200a when the air bag 14 is unobstructed or substantially unobstructed during deployment. This may be the case, for example, where the occupant is in a normally seated and belted position upon the occurrence of the event triggering deployment of the air bag. During such a deployment, the vent door 110 and vent 100 will close, which will allow the pressure in the air bag 14 to increase to a pressure at which the second stitch line 420 is configured to rupture. The second stitch line 420 will then rupture, and the air bag 14 will reach its fully inflated and deployed condition.

From the above, those skilled in the art will appreciate that a predictable, reliable, and repeatable rupture of the first and second stitch lines 400 and 420 can be achieved by selecting a stitch thread with an appropriate tensile strength and using it in an appropriate configuration. For example, through testing, the magnitude of the tension T exerted on the portions of material 220a and 230a due to deployment of the air bag and the tension T exerted due to fully inflated conditions can be determined. The shape/configuration and material construction of the first stitch line 400 could be selected so that its rupture strength is at or about the magnitude of the measured deployment tensions. The shape/configuration and material construction of the second stitch line 420 could be selected so that its rupture strength is at or about the magnitude of the tensions measured during the fully inflated conditions.

Figure 9:
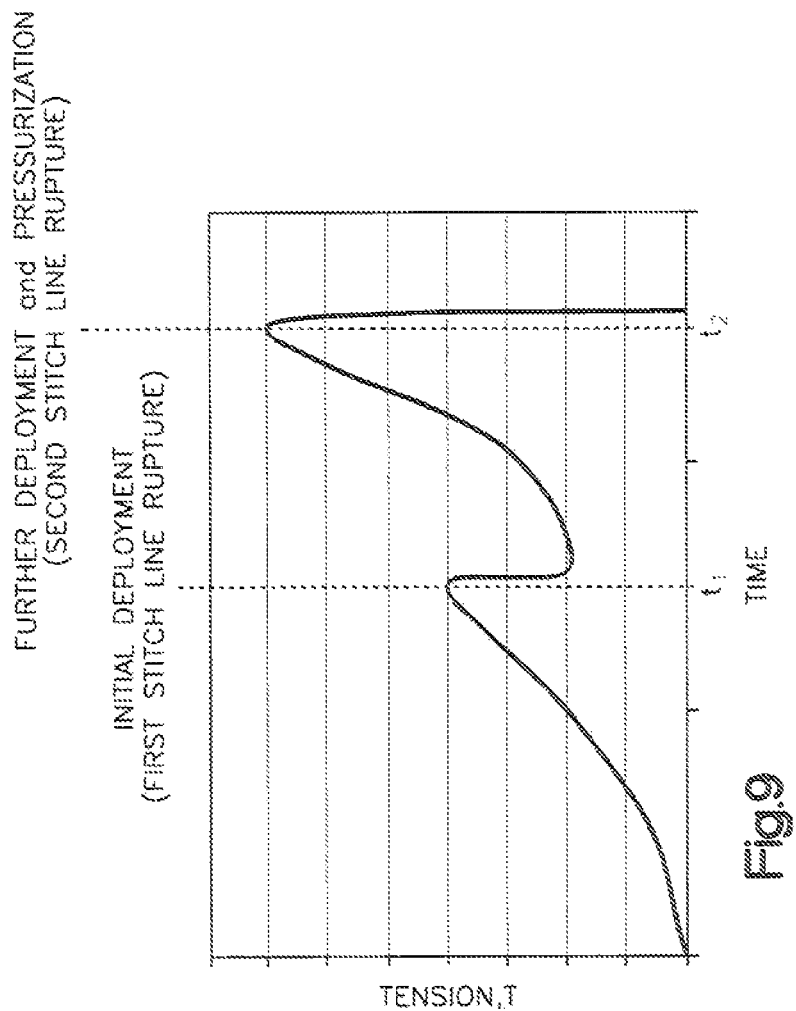
FIG. 9 is a chart illustrating certain properties of the apparatus of FIG. 8.

FIG. 9 is a chart that illustrates the function of the tear seam 200a of the embodiment of FIG. 8. As shown in FIG. 9, as the air bag 14 deploys, the tension T applied to the first and second portions of material 220a and 230a begins to increase. At time $t_1$, initial air bag deployment increases the tension T to a magnitude at which the first stitch line 400 ruptures. This causes a brief decrease in the tension T due to the force absorbing/damping provided by the first stitch line 400. As the event prompting deployment of the air bag continues, vehicle and occupant conditions, such as a normally seated and unbelted occupant, allow continued air bag deployment, which increases the tension T to the point at which the second stitch line 420 ruptures at time $t_2$. This completes rupture of the tear stitching 200a and releases the interconnection between first and second portions of material 220a and 230a.

Those skilled in the art will appreciate that the embodiment of the invention illustrated in FIGS. 8 and 9 allows for a wide variety of configurations of the tear seam 200a. For example, more than two stitch lines could be used to tailor further the performance characteristics of the tear stitching 200a. As another example, the first and second stitch lines 400 and 420 could be portions of a single stitch line instead of separate stitch lines.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, the apparatus comprising:
   an inflatable vehicle occupant protection device having a deflated condition and an inflated condition; and
   tear stitching interconnecting first and second overlying portions of the protection device to each another, the tear stitching comprising first and second stitch lines positioned next to each other and extending through both the first and second overlying portions, the first stitch line being adapted to rupture in response to tension of a first magnitude exerted on the interconnected portions while inflating to an initially deployed condition, the second stitch line being adapted to remain intact and being capable itself of maintaining the protection device in the initially deployed condition subsequent to rupture of the first stitch line and throughout inflation and deployment of the protection device.

2. The apparatus recited in claim 1, wherein the second stitch line is adapted to remain intact in response to obstructed deployment of the protection device and to rupture in response to unobstructed deployment and pressurization of the protection device.

3. The apparatus recited in claim 1, wherein each of the first and second stitch lines comprises a break point and first and second segments that extend away from the break point, the first stitch line having a configuration that is different than the second stitch line so that the rupture strength of the second stitch line is greater than the rupture strength of the first stitch line.

4. The apparatus recited in claim 1, wherein the first line has a V-shaped configuration and the second stitch line has an arc-shaped configuration.

5. The apparatus recited in claim 1, wherein the first line has a first arc-shaped configuration and the second stitch line has a second arc-shaped configuration.

6. The apparatus recited in claim 1, wherein the apparatus has an adaptive condition in which the second stitch line is adapted to rupture in response to deployment of the protection device beyond initial deployment of the protection device, the apparatus being adapted to be placed in the adaptive condition in response to at least one of sensed vehicle and occupant conditions.

7. The apparatus recited in claim 6, wherein the adaptive condition comprises actuation of at least one of an actuatable fastener and a vent.

8. The apparatus recited in claim 1, wherein the second stitch line is adapted to maintain the interconnection of the portions of the protection device in response to vented pressurization of the protection device, and to rupture in response to non-vented pressurization of the protection device.

9. An apparatus for helping to protect an occupant of a vehicle, the apparatus comprising:
   an inflatable vehicle occupant protection device having a deflated condition and an inflated condition; and
   tear stitching interconnecting first and second overlying portions of the protection device to each another, the tear stitching comprising first and second stitch lines positioned next to each other and extending through both the first and second overlying portions, the first stitch line being adapted to rupture in response to initial deployment of the protection device, the second stitch line being adapted to remain intact in response to obstructed deployment of the protection device and to rupture in response to unobstructed deployment and pressurization of the protection device.

10. The apparatus recited in claim 9, wherein the second stitch line is capable itself of maintaining the protection device in an initially deployed condition subsequent to rupture of the first stitch line, subsequent to the obstructed deployment, and throughout inflation and deployment of the protection device.

11. The apparatus recited in claim 9, wherein each of the first and second stitch lines comprises a break point and first and second segments that extend away from the break point, the first stitch line having a configuration that is different than the second stitch line so that the rupture strength of the second stitch line is greater than the rupture strength of the first stitch line.

12. The apparatus recited in claim 9, wherein the apparatus has an adaptive condition in which the second stitch line is adapted to rupture in response to deployment of the protection device beyond initial deployment of the protection device, the apparatus being adapted to be placed in the adaptive condition in response to at least one of sensed vehicle and occupant conditions.

13. The apparatus recited in claim 12, wherein the adaptive condition comprises actuation of at least one of an actuatable fastener and a vent.

14. The apparatus recited in claim 9, wherein the second stitch line is adapted to maintain the interconnection of the portions of the protection device in response to vented pressurization of the protection device, and to rupture in response to non-vented pressurization of the protection device.

15. An apparatus for helping to protect an occupant of a vehicle, the apparatus comprising:

an inflatable vehicle occupant protection device having a deflated condition and an inflated condition;

a vent that is actuatable to vent inflation fluid from the protection device; and tear stitching comprising first and second stitch lines positioned next to each other that form an interconnection that connects first and second overlying portions of the protection device to each another, the first stitch line extending through both the first and second overlying portions and being adapted to rupture in response to deployment of the protection device, the second stitch line extending through both the first and second overlying portions and being adapted to maintain the interconnection in response to vented pressurization of the protection device, and to rupture and thereby break the interconnection in response to non-vented pressurization of the protection device.

16. The apparatus recited in claim 15, wherein the second stitch line is capable itself of maintaining the interconnection and thereby maintaining the protection device in an initially deployed condition subsequent to rupture of the first stitch line and throughout inflation and deployment of the protection device.

17. The apparatus recited in claim 15, wherein each of the first and second stitch lines comprises a break point and first and second segments that extend away from the break point, the first stitch line having a configuration that is different than the second stitch line so that the rupture strength of the second stitch line is greater than the rupture strength of the first stitch line.

18. The apparatus recited in claim 1, wherein the first stitch line is formed from a first thread having a first tensile strength and the second stitch line is formed from a second thread having a second tensile strength greater than the first tensile strength.

19. The apparatus recited in claim 1, wherein the overlying portions of the protection device comprise a vent that is actuatable to vent inflation fluid from the protection device and a side panel of the protection device to which the vent is secured by the first and second stitch lines.

20. The apparatus recited in claim 9, wherein the overlying portions of the protection device comprise a vent that is actuatable to vent inflation fluid from the protection device and a side panel of the protection device to which the vent is secured by the first and second stitch lines.

21. The apparatus recited in claim 9, wherein the first stitch line is formed from a first thread having a first tensile strength and the second stitch line is formed from a second thread having a second tensile strength greater than the first tensile strength.

22. The apparatus recited in claim 15, wherein the first stitch line is formed from a first thread having a first tensile strength and the second stitch line is formed from a second thread having a second tensile strength greater than the first tensile strength.

* * * * *